| (12) | United States Patent<br>Baum et al. | (10) Patent No.: US 7,819,222 B2<br>(45) Date of Patent: Oct. 26, 2010 |

(54) DEVICE AND METHOD FOR ATTENUATING ENERGY ALONG A CONDUIT

(75) Inventors: Todd Alan Baum, Swartz Creek, MI (US); Ken Ming Leong, Rochester Hills, MI (US); Yungrwei Chen, West Bloomfield, MI (US); Robert James Messina, Harper Woods, MI (US)

(73) Assignee: YH America, Inc., Versailles, KY (US)

( * ) Notice: Subject to any disclaimer, the term of this patent is extended or adjusted under 35 U.S.C. 154(b) by 139 days.

(21) Appl. No.: 12/028,141

(22) Filed: Feb. 8, 2008

(65) Prior Publication Data

US 2009/0200104 A1 Aug. 13, 2009

(51) Int. Cl.
*F01N 1/00* (2006.01)
*F01N 1/02* (2006.01)
*F16K 47/02* (2006.01)
*F16F 7/00* (2006.01)
*F16L 3/00* (2006.01)
*F16L 9/00* (2006.01)
*F16L 9/18* (2006.01)
*F16L 55/04* (2006.01)
*F16L 55/027* (2006.01)
*G01F 1/42* (2006.01)

(52) U.S. Cl. ............... 181/249; 181/207; 181/233; 181/248; 181/255; 138/26; 138/40; 138/44; 138/106; 138/113; 138/156

(58) Field of Classification Search .......... 181/249, 181/233, 207, 255; 138/26, 40, 44, 106, 138/113, 156
See application file for complete search history.

(56) References Cited

U.S. PATENT DOCUMENTS

| 4,762,150 | A | * | 8/1988 | Kokuryu ................. 138/44 |
|---|---|---|---|---|
| 5,094,271 | A | * | 3/1992 | Fritz et al. .............. 138/30 |
| 5,251,669 | A | * | 10/1993 | Bishop ............. 137/625.23 |
| 5,495,711 | A | * | 3/1996 | Kalkman et al. ......... 60/469 |
| 5,582,006 | A | * | 12/1996 | Phillips ................. 60/327 |
| 5,697,216 | A | * | 12/1997 | Phillips ................. 60/469 |
| 5,708,216 | A | * | 1/1998 | Garshelis ........... 73/862.335 |
| 5,749,396 | A | * | 5/1998 | Takahashi et al. ........ 138/26 |
| 5,791,141 | A | * | 8/1998 | Phillips ................. 60/327 |
| 5,941,283 | A | * | 8/1999 | Forte .................... 138/26 |
| 6,119,728 | A | * | 9/2000 | Seidel-Peschmann et al. . 138/26 |
| 6,155,378 | A | * | 12/2000 | Qatu et al. ............. 181/255 |

(Continued)

*Primary Examiner*—Elvin G Enad
*Assistant Examiner*—Christina Russell
(74) *Attorney, Agent, or Firm*—Dinsmore & Shohl LLP

(57) ABSTRACT

A device for attenuating energy along a conduit, comprising a first member having an essentially semi-cylindrical outer surface and a first cavity extending substantially longitudinally from end to end. A second member having an essentially semi-cylindrical outer surface is provided, with the outer radii of the first and second members being the same. The second member also has a longitudinally extending cavity. When the two members are secured to one another to form the device, the two cavities face one another to form a bore that extends from end to end and has respective opposed tapered portions having a circular cross-sectional configuration that decreases in diameter inwardly. The bore also has a central, cylindrical portion disposed between the tapered portions and having an axial length that is no greater than one third of the overall axial length of the device.

15 Claims, 3 Drawing Sheets

U.S. PATENT DOCUMENTS

| | | | |
|---|---|---|---|
| 6,228,425 B1 * | 5/2001 | Sakata et al. | 427/244 |
| RE37,279 E * | 7/2001 | Fisher et al. | 138/156 |
| 6,329,735 B1 * | 12/2001 | Tanaka et al. | 310/239 |
| 6,442,838 B1 * | 9/2002 | Mussler | 29/890.127 |
| 6,478,053 B2 * | 11/2002 | Zanardi | 138/30 |
| 6,688,423 B1 * | 2/2004 | Beatty et al. | 181/207 |
| 7,059,353 B2 * | 6/2006 | Muscat et al. | 138/26 |
| 7,114,525 B2 * | 10/2006 | Krieger et al. | 138/44 |
| 7,325,570 B1 * | 2/2008 | Krieger | 138/26 |
| 7,347,222 B2 * | 3/2008 | Chen et al. | 138/30 |
| 7,373,824 B2 * | 5/2008 | Krieger et al. | 73/700 |
| 7,380,572 B2 * | 6/2008 | Chen | 138/26 |
| 2002/0059959 A1 * | 5/2002 | Qatu et al. | 138/30 |
| 2003/0193115 A1 * | 10/2003 | Bhattacharyya et al. | 264/328.8 |
| 2005/0045239 A1 * | 3/2005 | Krieger et al. | 138/44 |
| 2006/0060414 A1 * | 3/2006 | Kuroumaru et al. | 180/444 |
| 2006/0225944 A1 * | 10/2006 | Abner et al. | 180/417 |
| 2007/0034016 A1 * | 2/2007 | Maginnis et al. | 73/861.28 |

* cited by examiner

DEVICE AND METHOD FOR ATTENUATING ENERGY ALONG A CONDUIT

BACKGROUND OF THE INVENTION

The present invention relates to a device for attenuating energy along a conduit, and also relates to a method of attenuating energy along a conduit.

SUMMARY OF THE INVENTION

The device of the present application for attenuating energy along a conduit comprises a first member and a second member. The first member has an essentially semi-cylindrical outer surface with a first outer radius, and is provided with a first cavity that extends in a substantially longitudinal direction of the first member from a first end thereof to an opposite second end thereof. The second member also has an essentially semi-cylindrical outer surface with a second outer radius that is the same as the first outer radius of the first member. The second member is provided with a second cavity that extends in a substantially longitudinal direction of the second member from a first end thereof to an opposite second end thereof. The first and second members are adapted to be secured to one another to form the device for attenuating energy, and in a secured state the first and second cavities of the first and second members are positioned facing one another so as to form a bore in the device that extends from a first end of the device to an opposite second end thereof. The bore has respective opposing tapered portions having a first axial length and a circular cross-sectional configuration that decreases in diameter inwardly from the respective end of the device. The bore has a central, cylindrical portion that is disposed between and interconnects the tapered portions. The cylindrical portion of the bore has a second axial length that is no greater than one third of the overall axial length of the device.

Pursuant to the method of the present application for attenuating energy along a conduit, the first and second members are placed over the conduit in such a way that the cavities face one another, whereupon the first and second members are interconnected such that the cavities form the bore in the device that extends from one end to the opposite end of the device.

BRIEF DESCRIPTION OF THE DRAWINGS

Several exemplary embodiments of the energy attenuation device of the present application are illustrated in the accompanying schematic drawings, in which.

DESCRIPTION OF SPECIFIC EMBODIMENTS

Figure 1:
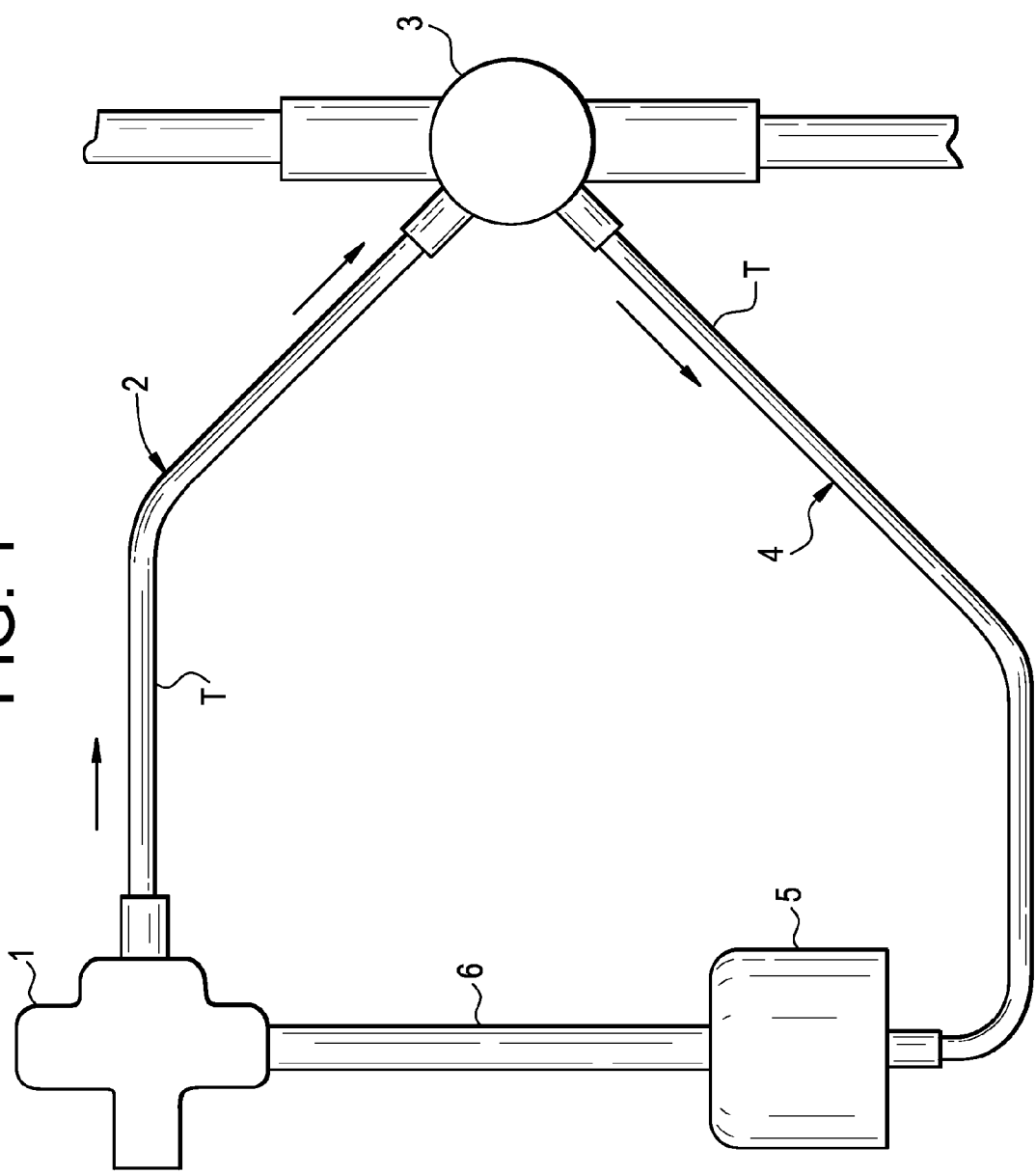
FIG. 1 shows a simplified automotive power steering system.

While the various features of this invention are hereinafter illustrated and described as providing a sound or energy attenuation device for an automotive power steering system, it is to be understood that the various features of this invention can be utilized singly or in various combinations thereof to provide an energy attenuation device for other systems and conduits that convey a fluid, especially liquid under pressure.

Therefore, this invention is not to be limited to only the embodiments illustrated in the drawings, because the drawings are merely utilized to illustrate one of the wide variety of usages of this invention.

Referring now to the drawings in detail, FIG. 1 illustrates a simplified automotive power steering system. In the illustrated embodiment, during operation, the power steering pressure pump 1 generates pressure ripples and other excitations that are transmitted through tubing T, such as steel tubing, as the pressure line 2, to the power steering gear 3, the return line 4, and the reservoir 5, and finally flow back to the pump 1 itself by means of the supply line 6. It should be noted that rather than being separated by a hose or similar conduit, the reservoir 5 and the pump 1 could actually be a single unit.

In order to greatly reduce noise and/or vibration generated by, for example, the power steering pump 1, the power steering gear 3, and/or the internal combustion engine of the vehicle, as well as by other sources of energy excitation, the energy attenuation device of this application can be disposed on the pressure line 2, between the steering pump 1 and the gear 3, on the return line 4, between the gear 3 and the reservoir 5 or the pump 1, and/or on the supply line 6. In addition, it would also be conceivable to dispose the energy attenuation device of the present application on other fluid-conveying conduits that transfer or receive vibrations from various automotive systems.

Figure 2:
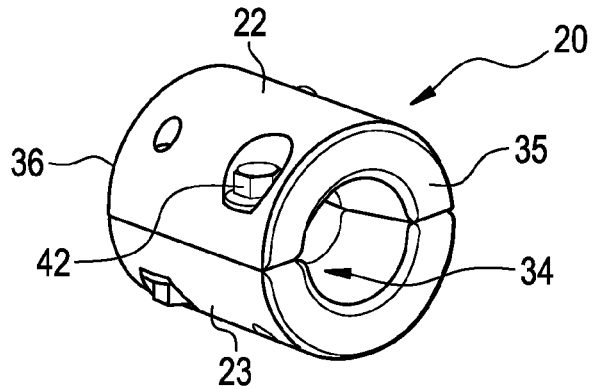
FIG. 2 shows one exemplary embodiment of the energy attenuation device of the present application.

One exemplary embodiment of the energy attenuation device of the present application is shown in FIGS. 2 and 3, and is designated generally by the reference numeral 20. The energy attenuation device 20 is composed of two members, namely a first member 22 and a second member 23 that are to be interconnected in a manner that will be described in detail subsequently.

Figure 3A:
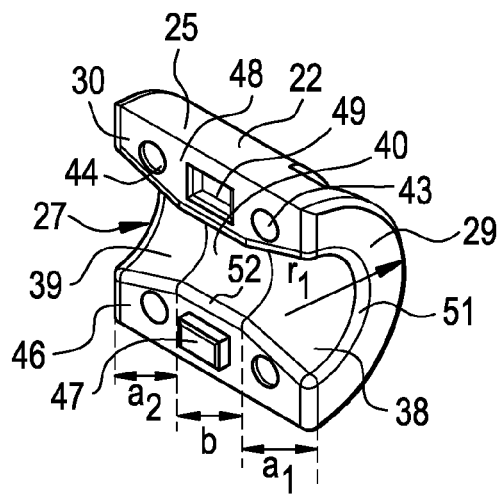
FIGS. 3A & 3B show the members of the energy attenuation device of FIG. 2.
Figure 3B:
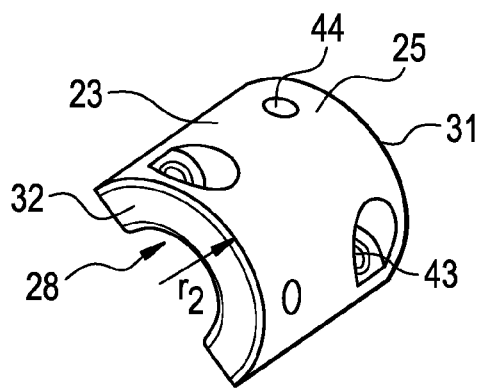

The two members 22 and 23 preferably have an identical construction and, when viewed from the outside, are each in the form of a semi-cylindrical component, with the exception of appropriate means for interconnecting the first and second members 22 and 23. In particular, each member 22 and 23 has an essentially semi-cylindrical outer surface 25. As shown in FIGS. 3a and 3b, the outer surface 25 of the first member 22 has a first outer radius $r_1$, and the outer surface 25 of the second member 23 has a second outer radius $r_2$, whereby the first radius $r_1$ and the second radius $r_2$ are preferably the same.

The first member 22 is provided with a cavity 27, i.e. a hollowed-out portion, that extends in a longitudinal direction of the first member 22 from a first end 29 thereof to an opposite second end 30 thereof. Similarly, the second member 23 is provided with a cavity 28 that extends in the longitudinal direction of the second member 23 from a first end 31 thereof to an opposite second end 32 thereof. The two cavities 27 and 28 of the first and second members 22 and 23 preferably have the same configuration.

When the first and second members 22 and 23 are interconnected or secured to one another to form the energy attenuation device 20 of the present application, the cavities 27 and 28 of the members 22 and 23 face one another and thereby cooperate with one another to form a central, essentially coaxial bore 34 in the device 20 that extends from a first end 35 of the device 20 to an opposite second end 36 thereof. The description of the unique configuration of the central bore 34 will be undertaken with reference to the first member 22. However, it is to be understood that this description applies equally to the second member 23.

Referring now to FIG. 3a, which shows the first member 22, it can be seen that the cavity 27 thereof does not have a constant diameter, although the cavity 27 preferably has a symmetrical configuration relative to a longitudinal central axis of the energy attenuation device 20. The cavity 27 is preferably also symmetrical relative to a plane extending centrally through the device 20 perpendicular to the longitudinal central axis of the device. In particular, the cavity 27 comprises two tapered portions 38 and 39, one adjacent each of the ends 29 or 30 of the first member 22. The tapered portions 38, 39 taper inwardly from the ends 29 and 30 respectively toward a central, cylindrical portion 40 of the cavity 27. Since as indicated above the cavity 28 of the second member 23 has the same configuration as does the cavity 27 of the first member 22, when the first and second members 22 and 23 are connected to one another, the central, cylindrical portion 40 of the cavity 27 interconnects the tapered portions 38 and 39 to complete the central bore 34. Thus, when the first and second members 22 and 23 are interconnected, the bore 34 formed by the facing and cooperating cavities 27 and 28 has a diameter at the ends 35 and 36 of the energy attenuation device 20 that decreases along the tapered portions 38 and 39 in the direction toward the central, cylindrical portion 40, which has a constant diameter due to its cylindrical configuration.

The tapered portion 38 of the first member 22 has an axial length $a_1$, while the tapered portion 39 of the first member 22 has an axial length $a_2$. The axial lengths $a_1$ and $a_2$ of the tapered portions 38 and 39 together comprise at least two thirds of the overall axial length of the energy attenuation device 20. Thus, the axial length (b) of the cylindrical portion 40 of the first member 22 comprises no more than one third of the overall axial length of the device 20. The cylindrical portion 40 need have an axial length (b) that is merely wide enough to provide sufficient surface area to secure or clamp the first and second members 22 and 23 of the device 20 against a hose, tube or other conduit.

As indicated above, the tapered portions 38 and 39 taper outwardly from the central, cylindrical portion 40 of the cavity 27 toward the ends 29 and 30 of the first member 22. The surface of each of the tapered portions 38 and 39 preferably extends at an angle of at least 15° relative to the longitudinal central axis of the bore 34. This taper or angle serves a critical function, especially when high expansion hoses are being used. Such hoses expand under the pressure of the pressurized fluid being conveyed therethrough, and as the hose expands it presses against lesser diameter portions of the energy attenuation device or mass damper. If the central bore 34 were entirely cylindrical, such expansion pressure from the hose could cause the means provided for interconnecting the first and second members 22 and 23 to break or otherwise fail and/or could cause the members themselves to break. Thus, with a minimal length central portion 40 that is merely wide enough to provide an adequate gripping or contact surface with the hose or conduit, the tapered portions 38 and 39 allow sufficient space for expansion of the hose without compromising the integrity of the first and second members 22 and 23 of the energy attenuation device 20. In addition, the tapered portions 38 and 39 provide for a reduction of weight of the overall device 20. Care must merely be taken that the angle of taper is not so great as to impinge upon the screw holes provided in the first and second members 22 and 23 for the interconnection thereof.

In the illustrated embodiment, the first and second members 22 and 23 are adapted to be interconnected by screws 42, for example self-tapping screws. The screws 42 extend through bores 43 in one of the members 22, 23 and are threaded into corresponding threaded holes 44 in the other member 23, 22. For example, two of the screws can extend from the first member 22 into the second member 23, and two further screws can extend from the second member 23 into the first member 22. Although in the illustrated embodiment, the members 22 and 23 are shown as being interconnected by a total of four screws 42, a different number of screws, for example two screws, may be adequate. It is merely essential that the mass of the energy attenuation device 20 not be movable once installed on a tube or hose. Furthermore, instead of using screws to connect the first and second members 22 and 23 to one another, other securing means can also be used, such as clamps, elastic retainers, or other fastening means. The important point is that the securing means be adequate to withstand the pressure of fluid within the hose or conduit.

The first and second members 22 and 23 may also be provided with means to correctly align and interlock them. In particular, as shown in FIG. 3a, the longitudinally extending planar surface 46 of the first member 22 is provided with a projection 47, while the other longitudinally extending planar surface 48 of the first member 22 is provided with a recess 49. The projection 47 and recess 49 are adapted to mate with a corresponding recess and projection respectively provided on the planar surfaces of the second member 23. Such alignment means also help to prevent the introduction of shearing forces on the screws 42.

To avoid sharp edges, the planar ends 29, 30 and 31, 32 of the first and second members 22 and 23 respectively can be chamfered to form beveled edges 51, especially along the inner edges adjacent to the tapered portions 38 and 39. Similarly, the planar longitudinally extending surfaces 46 and 48 of the first and second members 22 and 23 can be provided with beveled edges 52, especially along inner edges thereof adjacent to the cavities 27 and 28.

By way of example only, pursuant to one specific embodiment of the energy attenuation device 20 of the present application, the first and second members 22 and 23, which can, for example, be zinc cast parts, can each have a length of 50 mm. To provide a robust enough device 20, the outer diameter of the interconnected first and second members 22 and 23 can be approximately 48 mm, while the inner diameter of the central, cylindrical portion 40 can be approximately 16.76 mm. This inner diameter of the cylindrical portion 40 of the bore 34 is designed for a hose having an outer diameter of approximately 17 mm. The dimensions will, of course, change as a function of the hoses or diameters for which they are designed.

It should also be noted that at any cross-section taken perpendicular to the longitudinal central axis of the energy attenuation device 20, the central bore 34 will have a circular cross-sectional configuration.

Figure 4:
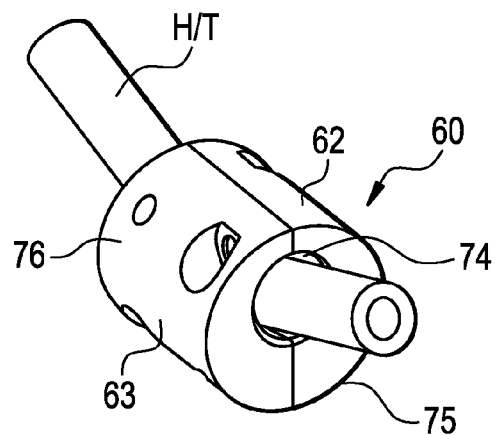
FIG. 4 shows another exemplary embodiment of the energy attenuation device of the present application.
Figure 5:
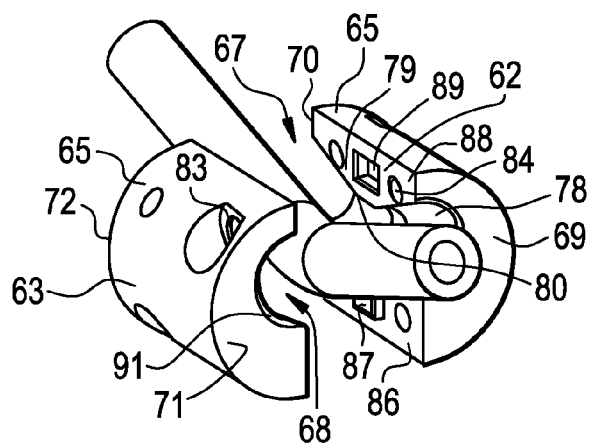
FIG. 5 is an exploded view of the energy attenuation device of FIG. 4, showing how it accommodates a hose, tube or other conduit.
Figure 6:
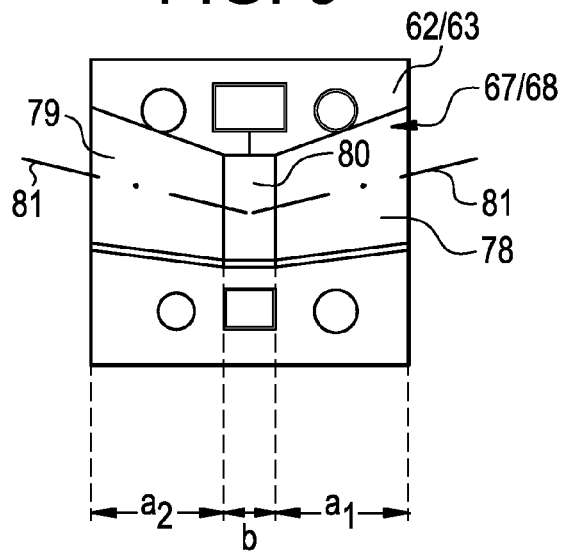
FIG. 6 is a plan view onto a member of the device of FIGS. 4 and 5.

Although in the energy attenuation device 20 previously described the first and second cavities 27, 28 of the first and second members 22, 23 each extend symmetrically relative to the longitudinal central axis of the device 20, i.e. of the essentially coaxial bore 34 thereof, in order to be able to accommodate bent hoses, tubing or other conduits, it would also be possible to configure each of the cavities of the first and second members such that they are not symmetrical relative to a longitudinal central axis of the device. Therefore, a further exemplary embodiment of an energy attenuation device of the present application is shown in FIGS. 4-6, and is designated generally by the reference number 60. The energy attenuation device 60 is also comprised of two members, namely a first member 62 and a second member 63 that are interconnected in a manner similar to that described in conjunction with the embodiments of FIGS. 2 and 3.

The two members 62 and 63 preferably have a substantially identical construction, with the exception of the optional alignment on interlocking means 87,89 that are reversed on each of the members, and will be discussed in detail subsequently. When viewed from the outside, the members 62, 63 are each in the form of a semi-cylindrical component, with the exception of appropriate means for interconnecting the first and second members 62 and 63. In particular, each member 62 and 63 has an essentially semi-cylindrical outer surface 65. As with the previously described embodiment of FIGS. 2 and 3, the outer surface 65 of the first member 62 has a first outer radius $r_1$, and the outer surface 65 of the second member 63 has a second outer radius $r_2$, whereby the first radius and the second radius are preferably the same.

The first member 62 is provided with a cavity 67, i.e. a hollowed-out portion, that extends in the longitudinal direction of the first member 62 from a first end 69 thereof to an opposite second end 70 thereof. Similarly, the second member 63 is provided with a cavity 68 that extends in the longitudinal direction of the second member 63 from a first end 71 thereof to an opposite end 72 thereof. The two cavities 67 and 68 of the first and second members 62 and 63 preferably have the same, although mirror image, configuration.

When the first and second members 62 and 63 are interconnected or secured to one another to form the energy attenuation device 60 of the present application, the cavities 67 and 68 of the members 62 and 63 face one another and thereby cooperate with one another to form a central bore 74 in the device 60 that extends from a first end 75 of the device 60 to an opposite second end 76 thereof. The unique configuration of the central bore 74, i.e. of the cavities 67 and 68 thereof, can be seen in FIGS. 5 and 6.

The cavities 67 and 68 of the first and second members 62 and 63 again do not have a constant diameter. Furthermore, in contrast to the embodiment illustrated in FIGS. 2 and 3, in this embodiment the cavities 67 and 68 do not have a symmetrical configuration relative to the longitudinal central axis of the energy attenuation device 60, as will be explained in detail subsequently. However, the cavities 67 and 68 are preferably symmetrical relative to a plane extending centrally through the device 60 perpendicular to the longitudinal central axis thereof. In particular, the cavities 67 and 68 each comprise two tapered portions 78 and 79, one adjacent to each of the outer ends 69, 70 and 71, 72 of the first and second members 62 and 63 respectively. The tapered portions 78 and 79 taper inwardly from the outer ends toward a central, cylindrical portion 80 of the cavities 67 and 68.

As indicated above, the tapered portions 78 and 79 of the cavities 67 and 68 do not taper symmetrically relative to the central longitudinal axis of the energy attenuation device 60. In particular, the central axes 81 of the tapered portions 78 and 79 extend at an angle, preferably, 5° to 45°, relative to the longitudinal axis of the energy attenuation device 60. Thus, the opening formed where the bore 74 formed by the cavities 67 and 68, i.e. the two tapered portions 78 and 79 and the central, cylindrical portion 80 thereof, opens out at the ends 75 and 76 of the energy attenuation device 60 is disposed eccentrically in the end faces of the device 60.

Since the cavity 68 of the second member 63 has the same configuration as does the cavity 67 of the first member 62, when the first and second members 62 and 63 are connected to one another, the central, cylindrical portion 80 of the cavities 67 and 68 interconnects the tapered portions 78 and 79 to complete the bore 74. Thus, when the first and second members 62 and 63 are interconnected, the bore 74 formed by the facing and cooperating cavities 67 and 68 has a diameter at the ends 75 and 76 of the energy attenuation device 60 that decreases along the tapered portions 78 and 79 in the direction toward the central, cylindrical portion 80, which has a constant diameter due to its cylindrical configuration. FIGS. 4 and 5 illustrate the accommodation of a hose, tube or other conduit H/T in the thus-formed bore 74. As is the case with the embodiment of the energy attenuation device 20 illustrated in FIGS. 2 and 3, with the embodiment of the energy attenuation device 60 illustrated in FIGS. 4-6 a gap having an angle of at least 15° is preferably provided between the surfaces of the tapered portions 78 and 79 on the one hand, and the outer surface of the hose tube or conduit H/T on the other hand.

As shown in FIG. 6, the tapered portion 78 of the members 62 and 63 has an axial length $a_1$, while the tapered portion 79 of the members 62 and 63 has an axial length $a_2$. The axial lengths $a_1$ and $a_2$ of the tapered portions 78 and 79 together comprise at least two thirds of the overall axial length of the energy attenuation device 60. Thus, the axial length b of the cylindrical portion 80 of the members 62 and 63 comprises no more than one third of the overall axial length of the device 60. Again, the cylindrical portion 80 need merely have an axial length b that is wide enough to provide sufficient surface area to clamp or otherwise secure the first and second members 62 and 63 of the device 60 against a hose, tube or other conduit that is disposed in the cavities 67 and 68.

As indicated above, the tapered portions 78 and 79 taper outwardly from the central, cylindrical portion 80 of the cavities 67 and 68 toward the ends of the first and second members 62 and 63. Since the central axes 81 of the tapered portions 78 and 79 extend at an angle relative to the longitudinal central axis of the energy attenuation device 60, the surface of each of the tapered portions 78 and 79 preferably extends at an angle that varies relative to the longitudinal central axis of the device 60. The taper or angle serves the function previously described in conjunction with the embodiment illustrated in FIGS. 2 and 3.

As with the previous embodiment, the first and second members 62 and 63 are adapted to be interconnected by screws, which extend through bores 83 in one of the members 63, 62 and are threaded into corresponding threaded holes 84 in the other member 62, 63. For example, two of the screws can extend from the first member 62 into the second member 63, and two further screws can extend from the second member 63 into the first member 62. Rather than a total of four screws, a different number of screws, for example two screws, may be adequate. It is merely essential that the mass of the energy attenuation device 60 not be movable once installed on a hose or tube H/T. Furthermore, instead of using screws to connect the first and second members 62 and 63 to one another, other securing means, such as clamps, elastic retainers, or other fastening means, can also be used. The securing means merely need to be adequate to withstand the pressure of fluid within the hose, tube or conduit.

Also with the embodiment illustrated in FIGS. 4-6, the first and second members 62 and 63 may be provided with means to correctly align and interlock them. In particular, for example as shown in FIG. 5, the longitudinally extending planar surface 86 of the first member 62 is provided with a projection 87, while the other longitudinally extending planar surface 88 of the first member 62 is provided with a recess 89. The projection 87 and recess 89 are adapted to mate with a corresponding recess and projection respectively provided on the planar surfaces of the second member 63.

To avoid sharp edges, the planar ends 69, 70 and 71, 72 of the first and second members 62 and 63 respectively can again be chamfered to form beveled edges 91, especially along the inner edges adjacent to the tapered portions 78 and 79. Similarly, the planar longitudinally extending surfaces 86 and 88 of the first and second members 62 and 63 can be provided with beveled edges, especially along inner edges thereof adjacent to the cavities 67 and 68.

As with the embodiment illustrated in FIGS. 2 and 3, in the embodiments of FIGS. 4-6, at any cross-section taken perpendicular to the longitudinal central axis of the energy attenuation device 60, the bore 74 will have a circular cross-sectional configuration.

The present invention is, of course, in no way restricted to the specific disclosure of the specification and drawings, but also encompasses any modifications within the scope of the appended claims.

What is claimed is:

1. A device for attenuating energy along a conduit, comprising:
   a first member having an essentially semi-cylindrical outer surface with a first outer radius, wherein said first member is provided with a first cavity that extends in a substantially longitudinal direction of said first member from a first end thereof to an opposite second end thereof; and
   a second member having an essentially semi-cylindrical outer surface with a second outer radius that is the same as the first outer radius of said first member, wherein said second member is provided with a second cavity that extends in a substantially longitudinal direction of said second member from a first end thereof to an opposite second end thereof, further wherein said first and second members are adapted to be secured to one another to form said device for attenuating energy, further wherein in a secured state of said first and second members, said first and second cavities thereof are positioned facing one another so as to form a bore in said device that extends from a first end of said device to an opposite second end thereof, further wherein said bore has respective opposing tapered portions having a first axial length and a circular cross-sectional configuration that decreases in diameter inwardly from the respective end of said device, further wherein said bore has a central, cylindrical portion that is disposed between and interconnects said tapered portions, further wherein said cylindrical portion of said bare has a second axial length, and wherein said second axial length of said central portion of said bore is no greater than one third of the overall axial length of said device,
   wherein the first member and the second member are configured to receive the conduit within the bore such that the conduit extends through the bore with the first member and the second member secured about an exterior of the conduit;
   wherein each of said first and second members is provided with an alignment or interlocking means;
   wherein said alignment or interlocking means comprises cooperating projections and recesses on surfaces of said first and second members that face one another when said first and second members are secured to one another.

2. A device for attenuating energy according to claim 1, wherein said bore is disposed centrally and essentially coaxially in said device.

3. A device for attenuating energy according to claim 2, wherein each of said cavities of said first and second members is symmetrical relative to a longitudinal central axis of said device.

4. A device for attenuating energy according to claim 3, wherein the surface of each of said tapered portions forms an angle of at least 15° relative to a central axis of said bore.

5. A device for attenuating energy according to claim 1, wherein each of said cavities of said first and second members is symmetrical relative to a plane extending centrally through said cylindrical portion of said bore perpendicular to said longitudinal central axis of said device.

6. A device for attenuating energy according to claim 1, wherein said first and second members are substantially identical to one another.

7. A device for attenuating energy according to claim 1, wherein each of said cavities of said first and second members is not symmetrical relative to a longitudinal central axis of said device.

8. A device for attenuating energy along a conduit, comprising:
   a member having an essentially cylindrical outer surface, wherein said member has a central bore that extends from a first end of said device to an opposite second end thereof, further wherein said bore has respective opposing tapered portions having a first axial length and a circular cross-sectional configuration that decreases in diameter inwardly from the respective end of said device, further wherein said bore has a central, cylindrical portion that is disposed between and interconnects said tapered portions, wherein said cylindrical portion of said bore has a second axial length, and wherein said second axial length of said central portion of said bore is no greater than one third of the overall axial length of said device;
   wherein the member is configured to secure around the conduit such that the member does not come into contact with pressurized fluid flowing through the conduit;
   wherein said member is comprised of two separate parts that are adapted to be secured to one another, wherein said two separate parts of said member comprise:
      a first member having an essentially semi-cylindrical outer surface with a first outer radius, wherein said first member is provided with a first cavity that extends in a substantially longitudinal direction of said first member from a first end thereof to an opposite second end thereof;
      a second member having an essentially semi-cylindrical outer surface with a second outer radius that is the same as the first outer radius of said first member, wherein said second member is provided with a second cavity that extends in a substantially longitudinal direction of said second member from a first end thereof to an opposite second end thereof, and wherein when said first and second members are secured to one another such that said first and second cavities thereof are positioned facing one another so as to form said central bore;
   wherein each of said first and second members is provided with an alignment or interlocking means, wherein said alignment or interlocking means comprises cooperating projections and recesses on surfaces of said first and second members that face one another when said first and second members are secured to one another.

9. A device for attenuating energy according to claim 8, wherein the surface of each of said tapered portions forms an angle of at least 15° relative to a central axis of said bore.

10. A device for attenuating energy according to claim 8, wherein each of said cavities of said first and second members is symmetrical relative to a longitudinal central axis of said device.

11. A device for attenuating energy according to claim 8, wherein each of said cavities of said first and second members is symmetrical relative to a plane extending centrally through said cylindrical portion of said bore perpendicular to said longitudinal central axis of said member.

12. A device for attenuating energy according to claim 8, wherein said first and second members are substantially identical to one another.

13. A device for attenuating energy according to claim 8, wherein each of said cavities of said first and second member is not symmetrical relative to a longitudinal central axis of said device.

14. A method of attenuating energy along a conduit, including the steps of:

provinding a first member having an essentially semi-cylindrical outer surface with a first outer radius, wherein said first member is provided with a first cavity that extends in a substantially longitudinal direction of said first member from a first end thereof to an opposite second end thereof;

providing a second member having an essentially semi-cylindrical outer surface with a second outer radius that is the same as the first outer radius of the first member, wherein said second member is provided with a second cavity that extends in a substantially longitudinal direction of said second member from a first end thereof to an opposite second end thereof;

placing said first and second members over the conduit in such a way that said cavities face one another; and interconnecting said first and second members such that said cavities form a bore in said device that extends from a first end of said device to an opposite second end thereof, further wherein said bore has respective opposing tapered portions having a first axial length and a circular cross-sectional configuration that decreases in diameter inwardly from the respective end of said device, further wherein said bore has a central, cylindrical portion that is disposed between and interconnects said tapered portions, further wherein said cylindrical portion of said bore has a second axial length, and wherein said second axial length of said central portion of said bore is no greater than one third of the overall axial length of said device, the bore being formed such that the conduit extends through the bore with the first member and the second member secured over the conduit such that the first and second members do not come into contact with pressurized fluid flowing through the conduit;

wherein each of said first and second members is provided with an alignment or interlocking means;

wherein said alignment or interlocking means comprises cooperating projections and recesses on surfaces of said first and second members that face one another when said first and second members are secured to one another.

15. A method according to claim 14, wherein each of said cavities of said first and second member is not symmetrical.

* * * * *

UNITED STATES PATENT AND TRADEMARK OFFICE
CERTIFICATE OF CORRECTION

| | | |
|---|---|---|
| PATENT NO. | : 7,819,222 B2 | Page 1 of 1 |
| APPLICATION NO. | : 12/028141 | |
| DATED | : October 26, 2010 | |
| INVENTOR(S) | : Todd Alan Baum et al. | |

It is certified that error appears in the above-identified patent and that said Letters Patent is hereby corrected as shown below:

Claim 1, line 45, change "bare" to --bore--

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,819,222 B2 | Page 1 of 1 |
| APPLICATION NO. | : 12/028141 | |
| DATED | : October 26, 2010 | |
| INVENTOR(S) | : Todd Alan Baum et al. | |

It is certified that error appears in the above-identified patent and that said Letters Patent is hereby corrected as shown below:

Claim 1, Column 7, line 45, change "bare" to --bore--

This certificate supersedes the Certificate of Correction issued February 1, 2011.

Signed and Sealed this
First Day of March, 2011

David J. Kappos
*Director of the United States Patent and Trademark Office*